United States Patent
Hagiwara

(10) Patent No.: US 9,335,507 B2
(45) Date of Patent: May 10, 2016

(54) LENS DRIVING DEVICE

(71) Applicants: Huizhou Dayawan Ever Bright Electronic Industry Co., Ltd., Huizhou (CN); JSS Optical Technology Co., Ltd., Hong Kong (HK); Huizhou Daya Bay Jss Optical Technology.Co., Ltd., Huizhou (CN)

(72) Inventor: Kazuyoshi Hagiwara, Kanagawa (JP)

(73) Assignees: HUIZHOU DAYAWAN EVER BRIGHT ELECTRONIC INDUSTRY CO., LTD., Huizhou (CN); JSS OPTICAL TECHNOLOGY CO., LTD., Hong Kong (HK); HUIZHOU DAYA BAY JSS OPTICAL TECHNOLOGY CO., LTD., Huizhou (CN)

( * ) Notice: Subject to any disclaimer, the term of this patent is extended or adjusted under 35 U.S.C. 154(b) by 0 days.

(21) Appl. No.: 14/462,633

(22) Filed: Aug. 19, 2014

(65) Prior Publication Data

US 2015/0055231 A1 Feb. 26, 2015

(30) Foreign Application Priority Data

Aug. 20, 2013 (JP) ................................. 2013-170721

(51) Int. Cl.
| | | |
|---|---|---|
| *G02B 7/02* | (2006.01) | |
| *H02K 41/03* | (2006.01) | |
| *G02B 7/09* | (2006.01) | |
| *G02B 7/08* | (2006.01) | |
| *G03B 3/10* | (2006.01) | |
| *G03B 5/02* | (2006.01) | |
| *G03B 5/04* | (2006.01) | |

(52) U.S. Cl.
CPC ................ *G02B 7/023* (2013.01); *G02B 7/026* (2013.01); *G02B 7/08* (2013.01); *G02B 7/09* (2013.01); *H02K 41/031* (2013.01); *G03B 3/10* (2013.01); *G03B 5/02* (2013.01); *G03B 5/04* (2013.01)

(58) Field of Classification Search
CPC .......... G02B 7/023; G02B 7/026; G02B 7/04; G02B 7/06; G02B 7/08; G02B 7/102; G02B 26/0875; G02B 27/646; G03B 3/00; G03B 3/10; G03B 5/00; G03B 5/02; G03B 5/04; G03B 2205/0015; G03B 2205/0007; H02K 41/02; H02K 41/03; H02K 41/031
USPC ........................ 359/811, 813, 814, 824, 557; 348/208.11, 208.5, 345; 310/12.16
See application file for complete search history.

(56) References Cited

U.S. PATENT DOCUMENTS 7,460,775 B2 * 12/2008 Umezu .................. G03B 17/02
359/557
7,852,579 B2 * 12/2010 Osaka .................... G02B 7/102
359/824

FOREIGN PATENT DOCUMENTS

| CN | 101216589 A | 7/2008 |
| CN | 102135656 A | 7/2011 |
| CN | 102830570 A | 12/2012 |
| CN | 203981946 U | 12/2014 |
| JP | 2005128405 A | 5/2005 |
| JP | 2009265210 A | 11/2009 |

OTHER PUBLICATIONS

SIPO, Search Report and First Notice of Review Opinion, CN. App. No. 201410406238.4.

* cited by examiner

*Primary Examiner* — Loha Ben
(74) *Attorney, Agent, or Firm* — Hemishere Law, PLLC

(57) ABSTRACT

The present invention provides a lens driving device having a component for limiting a movement amount generated during impacting, wherein an impact force is alleviated by utilizing the component for limiting the movement amount, so that a driving coil can be prevented from falling off, and the damage to the leaf springs can be alleviated. The leaf springs formed into a cantilever beam structure as the damper for alleviating the impact in the vertical direction and the planar direction are arranged between the lower fixing body and the upper fixing body, and the impact force can be alleviated by utilizing first projection parts and second projection parts projected out from the lens support, and the existing structure does not need to be greatly changed.

6 Claims, 8 Drawing Sheets

LENS DRIVING DEVICE

CROSS-REFERENCE TO RELATED APPLICATIONS

None.

BACKGROUND OF THE INVENTION

1. Field of the Invention

The present invention relates to a lens driving device used for a camera installed in a portable phone, a smart phone or a tablet device and the like, in particular to a lens driving device with leaf springs, wherein the leaf springs are used for elastically supporting a lens support for retaining an object lens.

2. Description of Related Art

In recent years, along with high pixelate of the camera installed in the portable phones, the smart phones or the tablet devices and the like, almost all cameras have automatic focusing function. As shown in FIG. 7, as a driving manner of a lens system with the automatic focusing function, the lens driving device using a voice coil motor in simple structure is widely adopted.

For example, as shown in FIG. 7 to FIG. 10, the lens driving device is provided with a lens support 3, a driving coil 4, a lower spring 2 and an upper spring 7, a magnet yoke 9 and a plurality of magnets 6. The lens support 3 is used for keeping a lens (not shown in the figures) at a central position and is provided with a screw thread part 3d. The driving coil 4 is installed on the lens support 3. The lower spring 2 and the upper spring 7 are installed on the lens support 3 and are used for supporting the lens support 3 from an upper position and a lower position, respectively. The magnet yoke 9 is installed around the lens support 3 and is composed of magnetic bodies such as soft iron and the like. The magnets 6 are installed within the magnet yoke 9, and an outer circumference shape of each magnet 6 is formed into a shape corresponding to the inner wall of the magnet yoke 9, and an inner circumference shape of each magnet 6 is formed into a shape corresponding to the outer circumference shape of the driving coil 4.

A shape of an outline part 2d of each lower spring 2 corresponds to the shape of a leaf spring outline retaining part 1d of a lower fixing body 1, and the outline part 2d is fixed to the lower fixing body 1. A shape of an outline part 7d of each upper spring 7 corresponds to the shape of a leaf spring outline retaining part 8d of an upper fixing body 8 installed on the magnet yoke 9, and the outline part 7d is installed on the upper fixing body 8.

Guiding parts 1b are arranged at four corners of the lower fixing body 1 and abut against guiding parts 8b configured at four corners of the upper fixing body 8, this configuration determines the whole height of the fixing body.

In the lens driving device provided with the lower springs 2 and the upper springs 7, the lower springs 2 and the upper springs 7 need to be installed stably. Therefore, the outline parts 2d of the lower springs 2, the outline parts 7d of the upper springs 7 and root parts need to be fixed at preset positions stably (with UV adhesives or thermocuring adhesive materials and the like in general) on the leaf spring outline retaining part 1d of the lower fixing body 1 and the leaf spring outline retaining part 8d of the upper fixing body 8.

The driving coil 4 is positioned closer to the inner side of the radius direction than the magnets 6, and is arranged in a magnetic field generated by the magnet yoke 9 and the magnets 6, the magnetic field is in radioactive distribution. Therefore, as shown in arrows in FIG. 8, when the driving coil 4 is electrified, the driving coil 4 generates a Lorentz force towards an object to be shot (up and down directions/vertical direction), so that the lens support 3 can move to the preset position where the restoring forces of the upper springs 7 and the lower springs 2 are balanced.

Therefore, in the lens driving device as shown in FIG. 7 and FIG. 8, an electrified current value of the driving coil 4 is controlled so as to control the movement amount of the lens support 3, thus the position of the lens (unshown in figures) can be controlled freely.

Moreover, as shown in FIG. 8 and FIG. 10, a first clamping mechanism for limiting the movement amount in the vertical direction is provided with a clamping part (projection part) 8a for limiting the maximum movement amount of the lens on the upper fixing body 8, and a front end clamping part 3a arranged at the front end part of the lens support 3 respectively. When the clamping part 8a of the upper fixing body 8 does not move, the clamping part 8a of the upper fixing body 8 and the front end clamping part 3a of the lens support 3 are only isolated at an interval (maximum movement amount) C, and during driving, the clamping part 8a of the upper fixing body 8 abuts against the front end clamping part 3a of the lens support 3, thus the interval C is limited (the clamping part 8a cannot move at the state that the interval C is zero). Moreover, under the condition, the guiding parts 7a of the upper springs 7 are engaged with the front end clamping part 3a of the lens support 3, which determines the position of a rotate direction of the lens support 3.

Moreover, as an example that the maximum movement amount (interval C) in the vertical direction is limited, the lens support 3 is not provided with the front end clamping part 3a sometimes, so that the lower surface of the clamping part 8a of the upper fixing body 8 abuts against inner outline parts 7e of the upper springs 7 which is fixed on the upper surface of the lens support 3 (unshown in figures).

As shown in FIG. 10, generally, the lens driving device is such designed so that a second clamping mechanism used for limiting a movement amount in the planar direction abuts against the magnet yoke 9 formed by soft iron base material with the maximum strength in general, thus a bending part 9a of the magnet yoke 9 and an inner side wall part (clamping part in the side face direction) 3e of the lens support 3 are configured to separated with each other at an internal (maximum movement amount) E. That is to say, the bending part 9a of the magnet yoke 9 abuts against the inner side wall part 3e of the lens support 3, so that the interval E in the planer direction is limited (the state that the interval E is zero is formed so that the clamping part cannot move).

Moreover, in the lens driving device that the magnet yoke 9 is not provided with the bending part 9a on the inner side, in order to enable the distance between the outermost part of the lens support 3 and the inner side of the magnet yoke 9 to be the interval E, the outermost part of the lens support 3 abuts against the inner side of the magnet yoke 9 sometimes so as to limit the movement amount in the left and right direction (unshown in figures).

In the existing lens driving device using the voice coil motor, in order to prevent each component from being contacted with each other to cause magnetic hysteresis, the upper side and the lower side of the lens support 3 are connected together just by using the upper springs 7 and the lower springs 2 respectively. Therefore, after the upper fixing body 8 begins to float upwardly when being driven, during the period of moving to the interval (maximum movement amount) C, the intervals between the upper fixing body 8 and each component are retained, and the upper fixing body 8 does not contact other components.

Therefore, under the condition that the lens driving device falls down to apply an impact in the vertical direction, the front end clamping part 3a of the lens support 3 collides with the clamping part 8a of the upper fixing body 8 so as to cause damage for both parties, or cause detachment of the driving coil 4, or transfer the impact to the connected lower springs 2 or upper springs 7 leading to generate micro deformation, thus the condition that the characteristics of the lens driving device are worsened appears.

Moreover, under the impact condition in the planar direction, the impact is applied to the inner side wall part 3e of the lens support 3 and the bending part 9e of the magnet yoke 9, thus strain is generated in the inner side wall part 3e of the lens support, or a welded joint of a joint part of resin begins to be damaged, or the driving coil 4 falls off, or the impact is transferred to the connected lower springs 2 or upper springs 7 leading to generate micro deformation, thus results in the condition that the characteristics of the lens driving device are worsened.

Particularly, recently, in order to be suitable for the high pixelate of the camera, the boundary dimension of the lens driving device does not change according to market requirement, the diameter of the lens is increased as much as possible, and the lens is thinned further. Therefore, in order to unable the pushing force (driving force) to decrease as much as possible to form the lens driving device, the thickness of the part except the magnets 6 needs to be thinned greatly at the state that the shapes and sizes of the current magnets 6 are kept as much as possible.

Moreover, in order to prevent damage caused by the impact, the endurance (impact resistance) of the clamping part 8a needs to be improved, and thus the clamping part 8a needs to be thickened (the wall thickness is thickened or the width is enlarged). Therefore, under the condition that the lens is required to be in a large size along with the high pixelate of the camera, the lens driving device needs to be in a small size, and two contradictory conditions that the lens is in a large size and the lens driving device is in a small size need to be met.

As a method for alleviating the impact in the vertical direction, as shown in JP No. 2006-251728 literature, a plurality of elastic projection parts are arranged near the clamping part 8e of the upper fixing body 8, but sufficient length needs to be ensured so as to obtain sufficient elastic force since a supporting body is made of ordinary liquid crystal polymer used in the lens driving device. In the lens driving device formed above, the size must be extended in the vertical direction to obtain the elastic force, but the thickness is thinned only by keeping short and small which causes a problem on strength or formation, and thus the lens driving device is difficult to be in a small size.

Moreover, in recent years, for the lens driving devices provided with the yoke 9 at the outermost for dustproof shielding, it is difficult to form a compact damper structure on the inner side of the magnet yoke just as disclosed in JP No. 2006-251728 literature.

Moreover, as the lens driving device needs to adapt to the use of high pixel in recent smart phones, tablet devices and the like, the lens with larger lens diameter than that of a lens driving device before is used or a laminated lens with increased number of lens sheets (for example, the number of the lens sheets in the existing lens driving device is set to be four from three, and is set to be five from four). Along with the increase of the number of the sheets of the laminated lens or the amplification of the lens diameter, the dead weight of the lens is increased, and the dead weight of the lens driving device is also increased. When the dead weight of the lens driving device is increased, the impact that the lens driving device sustained is increased, the impact force increased along with the increase of the weight needs to respond, and thus the projection part as the clamping part 8a or the inner wall of the lens support 3 must be thicken so as to increase the strength, which prevents the lens driving device from being in a small size.

Therefore, in the current lens driving device, an impact strategy that will not hinder miniaturization needs to be provided.

SUMMARY OF THE INVENTION

In order to solve the above-mentioned problem, the present invention aims to provide a lens driving device which is incapable of causing a large size, is capable of alleviating the impact to the clamping part or the inner side wall of the lens support which acts as a movement amount limiting part, so the impact resistance is easily improved.

The lens driving device includes a lens support, an upper fixing body and a lower fixing body, an upper leaf spring and a lower leaf spring, a first clamping mechanism and a second clamping mechanism. The lens support is used for retaining a lens. The upper and the lower fixing bodies are configured on the outer side of the lens support. The upper and lower leaf springs are used for connecting the lens support with the upper and the lower fixing bodies from the side of the object to be shot of the lens, namely from an upper side of an opening part side, and from a lower side opposite to the upper side of the opening part side, respectively. The first clamping mechanism is used for limiting a maximum movement amount of the lens support in a vertical direction. The second clamping mechanism is used for limiting a maximum movement amount in a planar direction. The lens support is provided with first projection parts projected towards the outside of the lens support. Wherein the lens support is provided with plurality of first projection parts protrude outwardly from the lens support, and the plurality of first projection parts are formed on the side wall of the lens support, lower than an installation part of the driving coil; a leaf spring-shaped damper is configured on an upper side of the lower fixing body, and the damper is provided with a plurality of projection parts protruding towards the side wall of the lens support; the plurality of projection parts of the damper are configured on the upper side of the plurality of first projection parts of the lens support, the plurality of first projection parts of the lens support and the plurality of projection parts of the damper are mutually isolated in the vertical direction at a preset interval, and the isolation amount is smaller than the maximum movement amount of the first clamping mechanism in the vertical direction. Therefore, under the condition that the lens driving device is impacted by falling, the impact in the vertical direction can be alleviated, the damage of the impact to the clamping part as an existing movement amount limiting part or the wall part of the inner periphery of the lens support can be reduced, and the impact resistance can be improved.

Moreover, plurality of second projection parts protrude outwardly from the side wall of the lens support, and the plurality of second projection parts are lower than the installation part of the driving coil; side face parts of the plurality of projection parts of the damper and the plurality of second projection parts of the lens support are mutually isolated in the planar direction at a preset interval, and the isolation amount in the planar direction is smaller than the maximum movement amount of the second clamping mechanism in the planar direction. Thus, besides the effects generated on the basis of the structure mentioned above, the impact in the planar direction can also be alleviated.

Moreover, at least three or more first projection parts and at least three or more second projections of the lens support and at least three or more projection parts of the damper are arranged respectively.

Moreover, a shape of the lower fixing body is quadrilateral when being observed from a direction of an optical axis of the lens, the plurality of first projection parts and the plurality of second projection parts of the lens support and the plurality of projection parts of the damper are configured at the four corners of the quadrilateral.

Therefore, it is easy to add leaf spring-shaped dampers to the lens driving device, so the impact in the vertical direction and the planar direction can be alleviated, and the impact resistance is improved. Therefore, the impact lens driving device incapable of causing a large size can be provided.

Moreover, the summary of the invention does not list all features required by the present invention, and auxiliary combination of these features can also become the present invention.

BRIEF DESCRIPTION OF THE SEVERAL VIEWS OF THE DRAWING(S)

The foregoing and other exemplary purposes, aspects and advantages of the present invention will be better understood in principle from the following detailed description of one or more exemplary embodiments of the invention with reference to the drawings, in which.

DETAILED DESCRIPTION OF THE INVENTION

The present invention is described through the embodiments as follows, the following embodiments do not limit claims in the present invention, and the combination of all features described in the embodiments does not necessary for solutions of the present invention.

Figure 1:
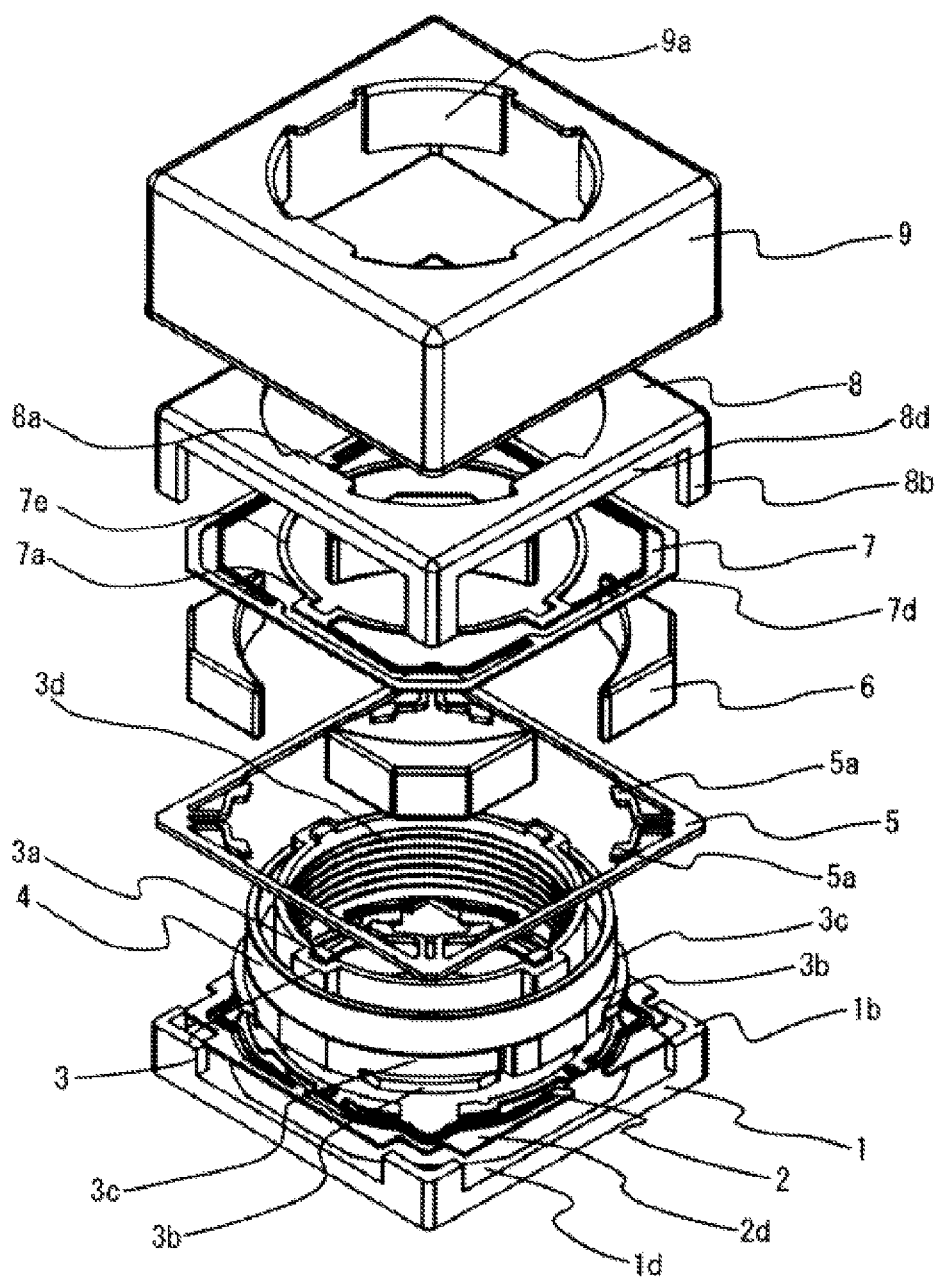
FIG. 1 is an exploded view of a lens driving device according to a first embodiment of the present invention.

FIG. 1 is an exploded view of a lens driving device of the present invention.

In the embodiment, the lens driving device includes: a lens support 3, a driving coil 4, a lower fixing body 1, an upper fixing body 8, an upper spring 7, a lower spring 2, a square magnet yoke 9, a plurality of magnets 6, a first clamping mechanism and a second clamping mechanism. The lens support 3 is used for retaining an unshown screw thread part 3d of the lens. The driving coil 4 is installed on the lens support 3. The lower fixing body 1 and the upper fixing body 8 are configured on the outside of the lens support 3. The upper spring 7 is used for connecting the lens support 3 and the upper and the lower fixing bodies 1, 8 to the side of the object to be shot (opening part side) of the lens, in other words, to the upper side. The lower spring 2 is connected to the lower side, opposite to the side of the object to be shot (opening part side), of the lens. The magnet yoke 9 is installed around the lens support 3 and is composed of magnetic substances such as soft iron. The magnets 6 are installed on the magnet yoke 9, an outer circumference shape of each magnet 6 is formed into the shape corresponding to the inner wall of the magnet yoke 9, and an inner circumference shape of each magnet 6 is formed into the shape corresponding to the outer circumference of the driving coil 4. The first clamping mechanism is used for limiting the maximum movement amount of the lens support 3 in the vertical direction. The second clamping mechanism is used for limiting the maximum movement amount of the lens support 3 in the planar direction perpendicular to the vertical direction.

A shape of an outline part 2d of the lower spring 2 corresponds to the shape of a leaf spring outline retaining part 1d of the lower fixing body 1, and is installed on the lower fixing body 1. A shape of an outline part 7d of the upper spring 7 corresponds to the shape of a leaf spring outline retaining part 8d of the upper fixing body 8 installed on the magnet yoke 9, and is installed on the upper fixing body 8. A guiding part 7a of the upper spring 7 is clamped with a front end clamping part 3a of the lens support 3, which is used for determining the rotate direction of the lens support 3.

The driving coil 4 is positioned closer to the inner side of the radius direction than the magnets 6, and is arranged in a magnetic field generated by the magnet yoke 9 and the magnets 6 in radioactive distribution. When the driving coil 4 is electrified, the driving coil 4 generates the Lorentz force towards the direction of the object to be shot (vertical direction), so that the lens support 3 can move to the preset position where restoring forces of the upper springs 2 and the lower springs 7 are balanced.

Figure 2:
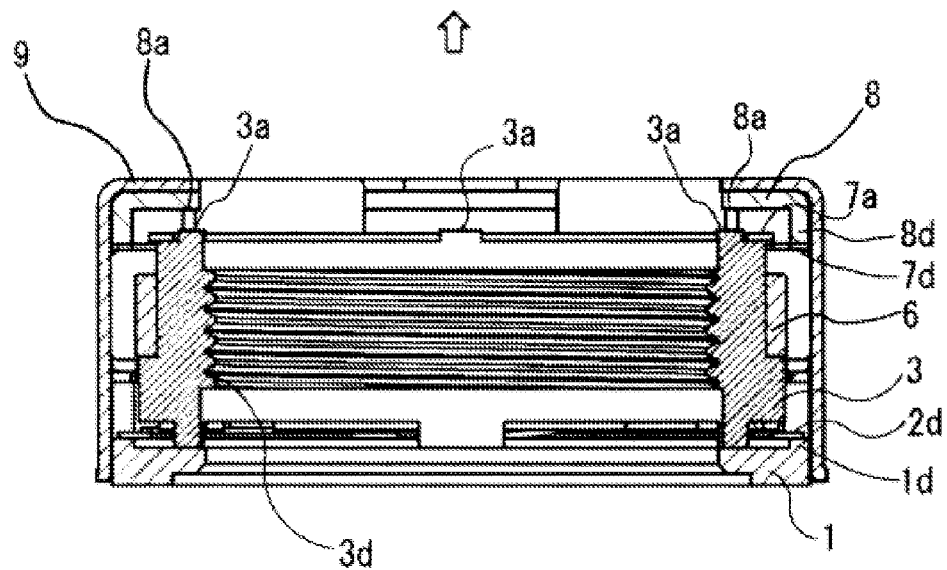
FIG. 2 is a cross-sectional view of the lens driving device according to the first embodiment of the present invention.
Figure 4:
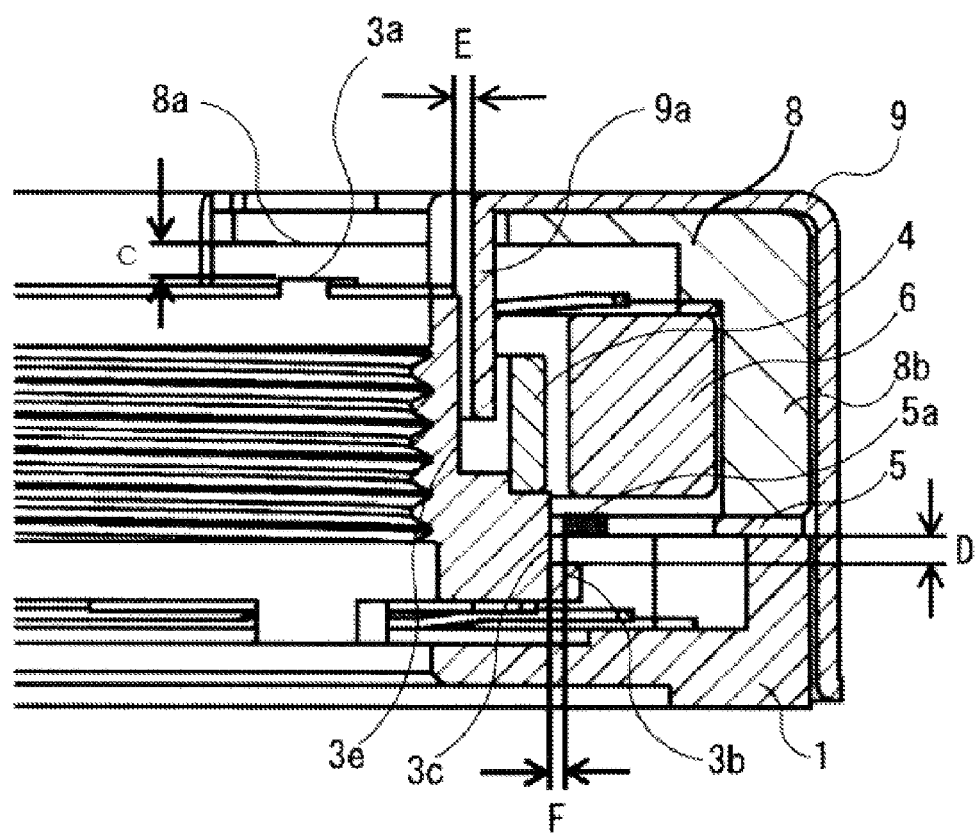
FIG. 4 is a diagram for illustrating a partial enlarged detail of the lens driving device of FIG. 3 according to the first embodiment of the present invention.

Moreover, as shown in FIG. 2 and FIG. 4, a first clamping mechanism for limiting the movement amount in the vertical direction is provided with a clamping part (projection part) 8a for limiting the maximum movement amount of the lens on the upper fixing body 8 and a front end clamping part 3a at the front end part of the lens support 3 respectively. When the clamping part 8a of the upper fixing body 8 does not move, the clamping part 8a of the upper fixing body 8 and the front end clamping part 3a of the lens support 3 are only separated from each other at an interval (maximum movement amount) C, hereto, the clamping part 8a of the upper fixing body 8 abuts against the front end clamping part 3a of the lens support 3 during driving.

As shown in FIG. 4, in the lens driving device, a second clamping mechanism used for limiting the movement amount in the planar direction is provided so that a bending part 9a of the magnet yoke 9 and an inner side wall part (side face clamping part) 3e of the lens support 3 are configured to be isolated at an internal (maximum movement amount) E.

Then, FIG. 1 is used for describing the damper 5 which is a patentable feature of the present invention.

As shown in FIG. 1, the lens driving device is provided with plate-like damper 5. The damper 5 is clamped between the upper parts of the guiding parts 1b configured at the four corners of the lower fixing body 1 and the lower part of the guiding part 8b of the upper fixing body 8. Moreover, a height of the guiding part 8b is smaller than a height of the existing guiding part subtracting a thickness of the damper 5. The four corners of the damper on the inner circumference side are provided with projection parts 5a projected towards the inner side. The projection parts in each corner of the damper are bended and looked like bowl-shaped.

The lens support 3 is provided with first projection parts 3b projected towards the outer circumference direction and second projection parts 3c slightly larger than the driving coil 4 seen from the side face direction. The first and second projection parts are arranged near a lower root part of the driving coil.

Figure 3:
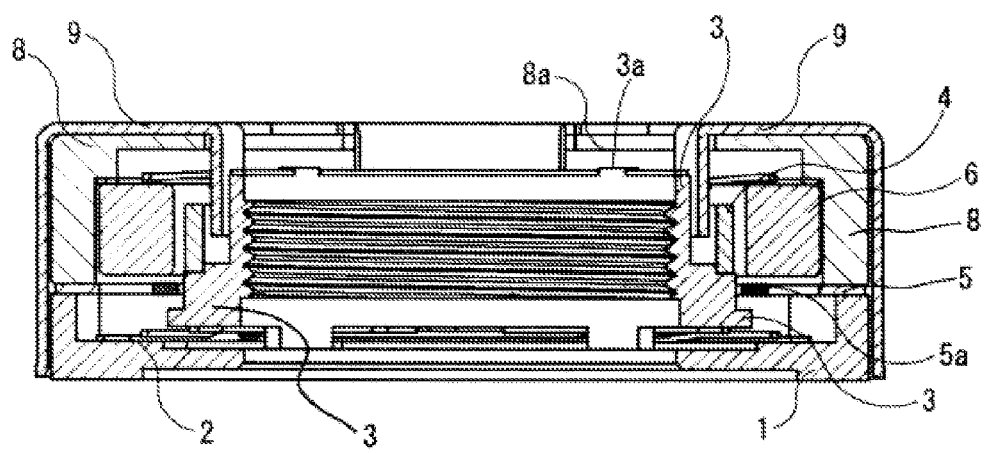
FIG. 3 is a cross-sectional view of the lens driving device of FIG. 2 cutting along a different direction according to the first embodiment of the present invention.

As shown in FIG. 3 and FIG. 4, in altitude-direction, an interval D between the projection parts 5a of the damper 5 and the first projection parts 3b is slightly smaller than the interval C between the clamping part 8a of the upper fixing body 8 and the front end clamping part 3a of the lens support 3 (the interval C is greater than the interval D).

Figure 5:
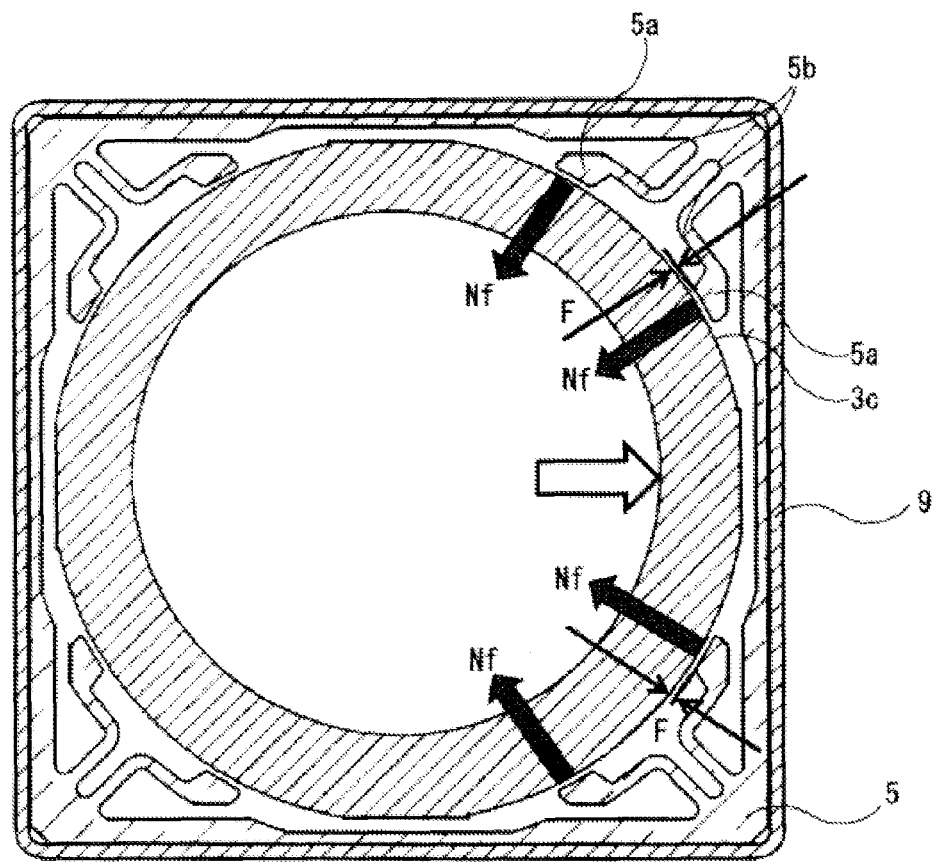
FIG. 5 is a cross-sectional view in the planar direction of a damper according to the first embodiment of the present invention.

FIG. 5 is a section view in the planar direction of the damper 5, cutting along the thickness direction, in other words, cutting along a surface parallel to a surface of the damper.

As shown in FIG. 5, the projection parts 5a of the damper 5 are formed into the shape 5b of an approximate cantilever beam, and are elastic in the vertical direction and the planar direction from the front end to the root part. The front ends of the projection parts 5a of the damper 5 have curvatures approximately equal to that of the second projection parts 3c of the lens support 3, and are formed into the shape that the circumferences of the second projection parts 3c are surrounded. Moreover, under the condition that the projection parts 5a are configured around the second projection parts 3c, an interval F is kept between the front ends of the projection parts and the second projection parts 3c.

Therefore, the structure of the damper is formed, and the projection parts 5a are elastic in the vertical direction and the planar direction, and can move flexibly.

As shown in FIG. 4, the interval F between the inner circumference face side of the projection parts 5a of the damper 5 and the second projection parts 3c in the side face of the lens support 3 is slightly smaller than an interval E between the bending part 9a of the magnet yoke 9 as the movement amount limiting part in the planar direction and the inner side wall part 3e of the lens support 3 (the interval E is greater than the interval F).

Under the condition that the impact is applied in the vertical direction, the intervals of the components as mentioned above are formed (the interval E is greater than the interval F), thus the first projection parts 3b of the lens support 3 collide with the projection parts 5a of the damper 5, the projection parts 5a are flexed in the direction towards the upper side and generate a bounce force in the direction towards the lower side so as to alleviate the impact force, and then the front end clamping part 3a of the lens support 3 contacts with the clamping part 8a of the upper fixing body 8 so as to stop impacting.

Moreover, as shown in FIG. 5, under the condition that the impact in the planar direction is applied, the second projection parts 3c of the lens support contact with the front end parts of the projection parts 5a of the damper 5 arranged opposite to the second projection parts 3c along with the movement of the lens support 3. When the projection parts 3c contact with the projection parts 5c, the projection parts 5a of the damper 5 are bent in the radius direction, and bounce force shown by an arrow Nf is generated so as to adsorb and alleviate the impact force. Then, the inner side wall part 3e of the lens support 3 contact with the bending part 9a of the magnet yoke 9 so as to stop impacting.

According to the embodiment as mentioned above, the projection parts 5a of the damper 5 composed of one component as mentioned not only can absorb the impact in the vertical direction but also can absorb the impact in the planar direction, thus the shape of the clamping part 8a does not need to be enlarged beyond the requirement, and the lens can be in a large size.

Moreover, according to the embodiment, the projection parts 5a of the damper 5 can be isolated and configured near the four corners of the damper, and can be effectively configured under the condition that the shape is not greatly changed.

Moreover, in the embodiment, the difference value between the interval C and the interval D and the difference value between the interval E and the interval F are preferably more than 0.05 mm, but it does not matter even if the differences do not reach the mentioned value, as long as the projection parts 5a of the damper 5 are formed into the size that the required bounce force is generated through bending. Therefore, the difference value between the interval C and the interval D and the difference value between the interval E and the interval F are suitably set according to the material, elastic coefficient, thickness or spring coefficient of the damper.

Moreover, in the embodiment, in order to absorbed the impact stably, the projection parts 5a of the damper 5 are arranged on eight parts (namely eight projection parts 5a are arranged), but the (three) projection parts at three parts required for the lowest limit can also be approximately configured at equal intervals by adjusting the thicknesses of the lower springs 2 and the upper springs 7, or using materials with different elastic coefficients, or adjusting the lengths of the bending parts of the projection parts 5a.

Figure 6:
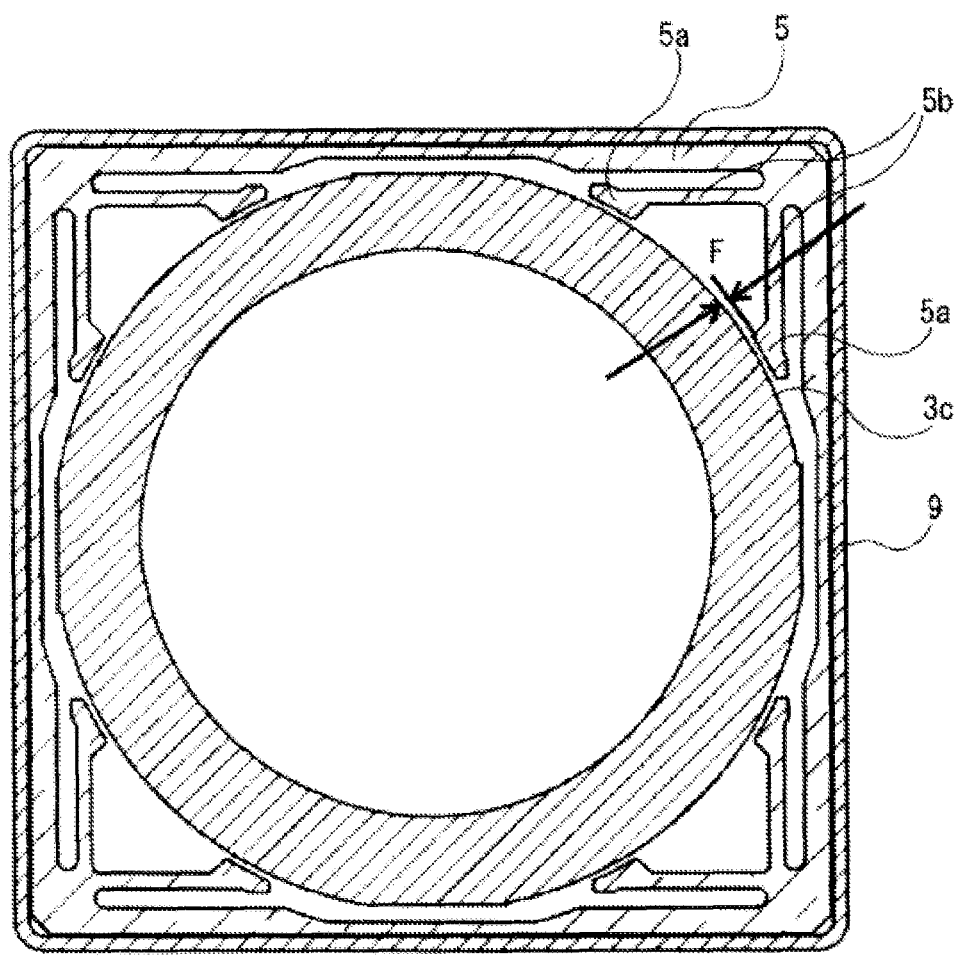
FIG. 6 is a cross-sectional view in the planar direction of a damper according to a second embodiment of the present invention.
Figure 7:
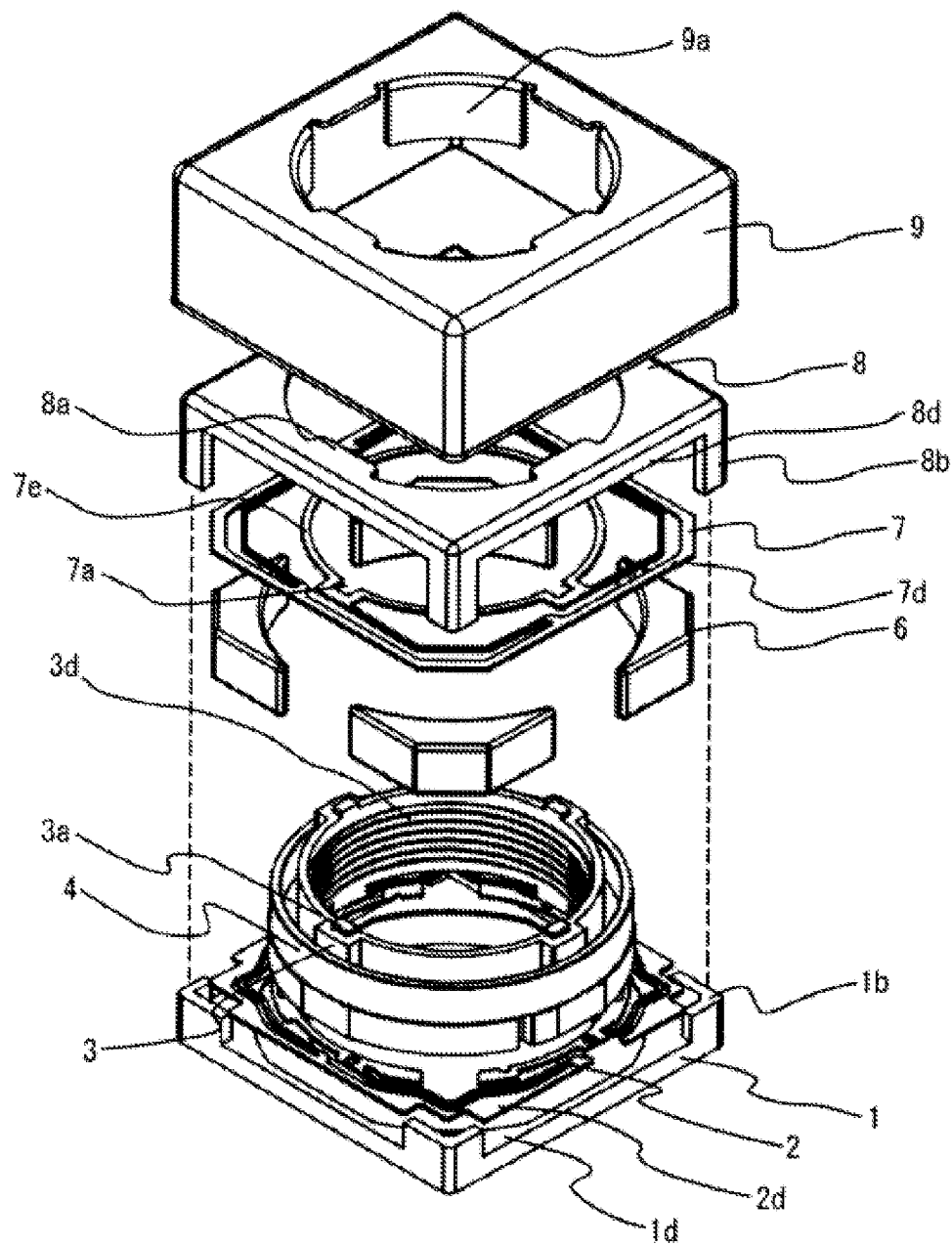
FIG. 7 is an exploded view of an existing lens driving device.
Figure 8:
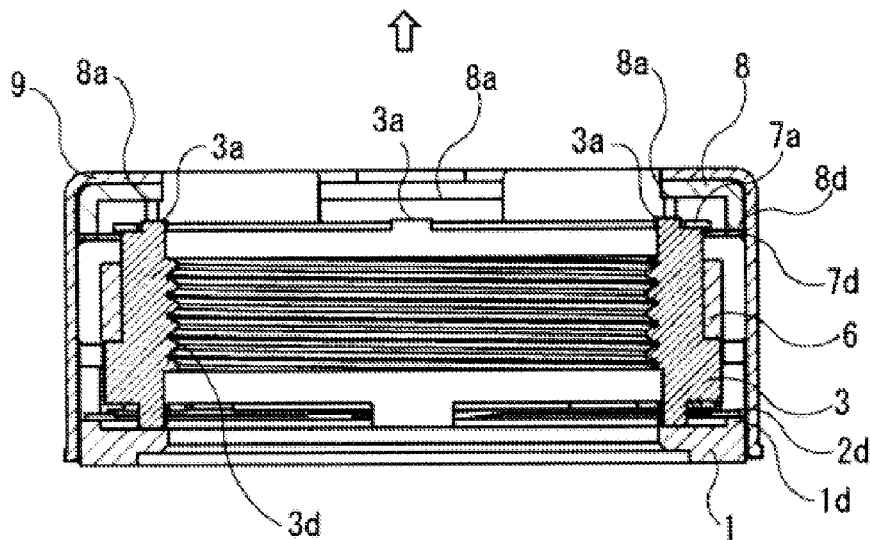
FIG. 8 is a cross-sectional view of the existing lens driving device of FIG. 7.
Figure 9:
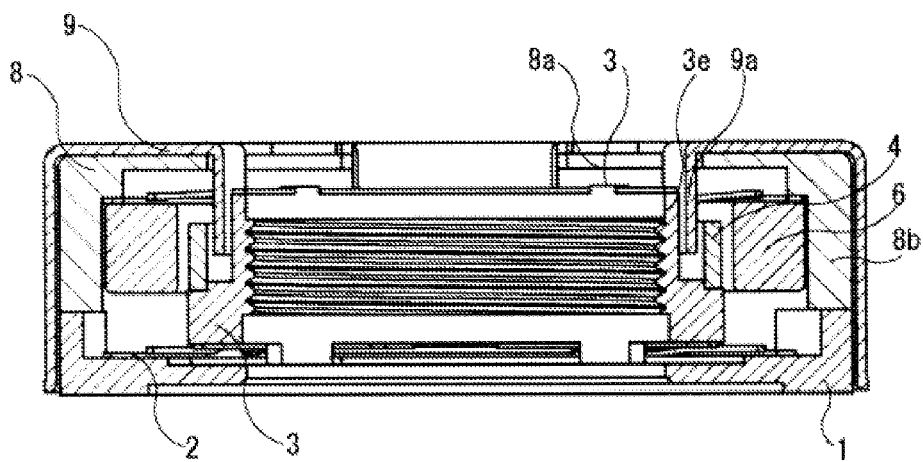
FIG. 9 is a cross-sectional view of the existing lens driving device of FIG 7 cutting along a different direction.
Figure 10:
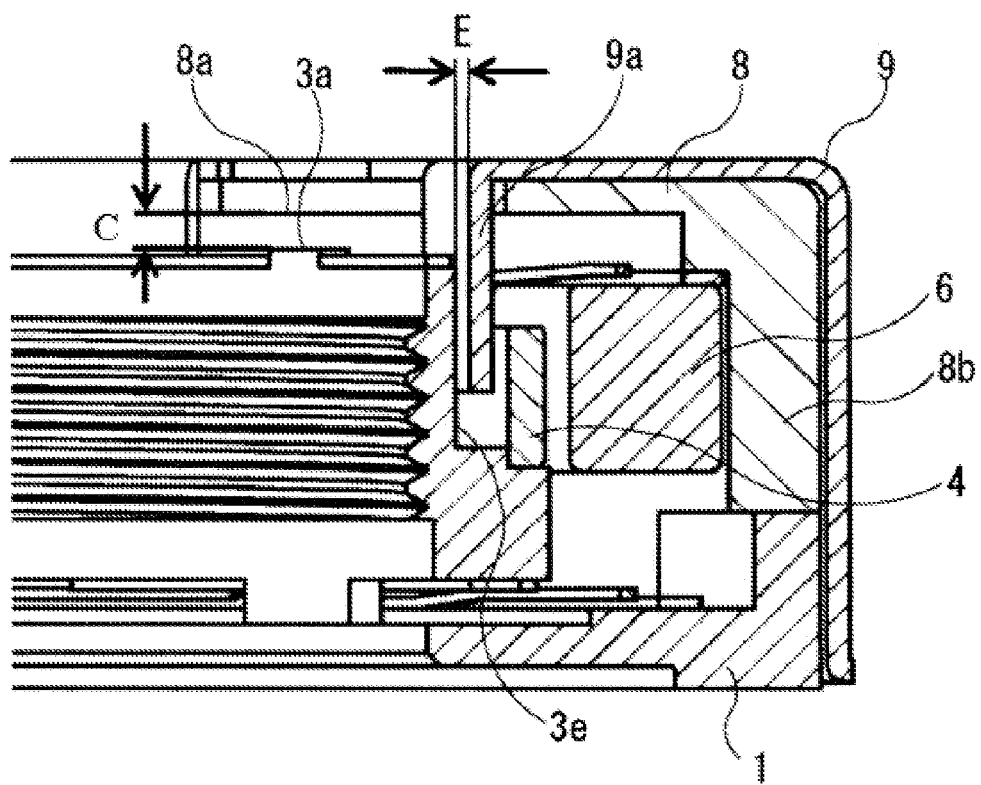
FIG. 10 is a diagram for illustrating a partial enlarged detail of the existing lens driving device of FIG. 9.

FIG. 6 illustrates the cross section in the planar direction of a damper 5 in a second embodiment of the present invention.

In the second embodiment of the present invention, the bending part 5b is formed into the shape of an approximately/substantially straight line, which is different from the above mentioned embodiment. Even if the bending part 5b is formed into a straight-line shape, it also can achieve the effect which is approximately the same as that of the first embodiment.

The embodiments are described above, but the technology scope of the present invention is not limited to the scope recorded in the embodiments. A person skilled in the art can know that it is obvious that the embodiments are changed or improved variously. According to the claims, it is obvious that the changed or improved embodiments also can be included in the technical scope of the present invention.

What is claimed is:

1. A lens driving device, comprising:
   a lens support for retaining a lens;
   an upper and a lower fixing bodies configured on the outside of the lens support;
   an upper leaf spring, configured for connecting the lens support and the upper fixing body from a side of an object to be shot of the lens, namely from an upper side of an opening part side;
   a lower leaf spring, configure for connecting the lens support and the lower fixing body from a lower side, opposite to the upper side of the opening part side, of the lens support;
   a first clamping mechanism for limiting a maximum movement amount of the lens in a vertical direction;
   a second clamping mechanism for limiting a maximum movement amount of the lens support in a planar direction, the lens support being provided with a plurality of first projection parts protrude outwardly from the lens support, and the plurality of first projection parts is formed on a side wall of the lens support, lower than an installation part of a driving coil installed thereon; and a leaf spring-shaped damper configured on an upper side of the lower fixing body;

wherein the damper is provided with a plurality of projection parts protruding towards the side wall of the lens support, the plurality of projection parts of the damper is configured on the upper side of the plurality of first projection parts of the lens support, the plurality of first projection parts of the lens support and the plurality of projection parts of the damper are mutually isolated in the vertical direction at a preset interval, and wherein the isolation amount is smaller than the maximum movement amount of the first clamping mechanism in the vertical direction.

2. The lens driving device of claim 1, wherein: the lens support is further provided with a plurality of second projection parts protruding outwardly from the side wall of the lens support, the plurality of second projection parts is lower than the installation part of the driving coil, side face parts of the plurality of projection parts of the damper and the plurality of second projection parts of the lens support are mutually isolated in the planar direction at a preset interval, and the isolation amount in the planar direction is smaller than the maximum movement amount of the second clamping mechanism in the planar direction.

3. The lens driving device of claim 2, wherein there are at least three first projection parts and at least three second projection parts of the lens support, and at least three projection parts of the damper.

4. The lens driving device of claim 2, wherein a shape of the lower fixing body is quadrilateral when being observed from a direction of an optical axis of the lens, the plurality of first projection parts and the plurality of second projection parts of the lens support, and the plurality of projection parts of the damper are configured at the four corners of the quadrilateral lower fixing body.

5. The lens driving device of claim 2, wherein each projection part of the damper is elastic in the vertical direction and the planar direction from its front end to its root part.

6. The lens driving device of claim 1, wherein each projection part of the damper is elastic in the vertical direction and the planar direction from its front end to its root part.

* * * * *